(12) United States Patent
Matsuno et al.

(10) Patent No.: US 8,992,726 B2
(45) Date of Patent: Mar. 31, 2015

(54) METHOD AND DEVICE FOR PEELING OFF SILICON WAFERS

(71) Applicant: Panasonic Corporation, Osaka (JP)

(72) Inventors: Koso Matsuno, Osaka (JP); Michirou Yoshino, Osaka (JP); Masayuki Takahashi, Osaka (JP); Tooru Furushige, Osaka (JP); Yuji Yamamoto, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 30 days.

(21) Appl. No.: 13/900,615

(22) Filed: May 23, 2013

(65) Prior Publication Data

US 2013/0319619 A1 Dec. 5, 2013

(30) Foreign Application Priority Data

May 31, 2012 (JP) .................................. 2012-124438
Feb. 12, 2013 (JP) .................................. 2013-024209

(51) Int. Cl.
*B32B 38/10* (2006.01)
*B28D 5/00* (2006.01)

(52) U.S. Cl.
CPC .............. *B32B 38/10* (2013.01); *B28D 5/0082* (2013.01); *Y10S 156/93* (2013.01); *Y10S 156/941* (2013.01)
USPC ........... 156/703; 156/711; 156/712; 156/752; 156/753; 156/930; 156/941

(58) Field of Classification Search
CPC .............................. H01L 21/00; B32B 37/00
USPC .......... 156/703, 711, 712, 752, 753, 930, 941
See application file for complete search history.

(56) References Cited

U.S. PATENT DOCUMENTS

| | | | |
|---|---|---|---|
| 5,447,596 A * | 9/1995 | Hayase .......................... | 156/750 |
| 5,800,665 A * | 9/1998 | Okaniwa et al. .............. | 156/701 |
| 6,025,117 A * | 2/2000 | Nakano et al. ................ | 430/314 |
| 6,076,585 A * | 6/2000 | Klingbeil et al. ............. | 156/701 |
| 8,419,895 B2 * | 4/2013 | Dang et al. .................... | 156/703 |
| 2002/0104616 A1 * | 8/2002 | De et al. ......................... | 156/344 |

(Continued)

FOREIGN PATENT DOCUMENTS

| | | |
|---|---|---|
| JP | 9-237770 A | 9/1997 |
| JP | 2000-208449 A | 7/2000 |

(Continued)

OTHER PUBLICATIONS

Korean Office Action for Application No. 10-2013-0059001, dated Feb. 24, 2014.

*Primary Examiner* — Philip Tucker
*Assistant Examiner* — Nickolas Harm
(74) *Attorney, Agent, or Firm* — RatnerPrestia

(57) ABSTRACT

A device for peeling off silicon wafers, including: a supporting member that is configured to support a board-shaped member to which plural silicon wafers are bonded via an adhesive; a heating unit for heating the board-shaped member; a shifting mechanism that is configured to shift, in a horizontal direction, the supporting member relatively with respect to the heating unit; a peeling-off mechanism that is configured to peel off the silicon wafers one by one; and a container for allowing the silicon wafers, the board-shaped member and the supporting member to soak in a liquid.

4 Claims, 4 Drawing Sheets

(56) References Cited

U.S. PATENT DOCUMENTS

2009/0223539 A1* 9/2009 Gibbel .............................. 134/2
2012/0258315 A1* 10/2012 Foulc et al. ................... 428/416
2013/0118691 A1* 5/2013 George et al. ................. 156/704
2014/0130986 A1* 5/2014 Yoshino et al. ............... 156/703

FOREIGN PATENT DOCUMENTS

| | | |
|---|---|---|
| JP | 3149712 U | 3/2009 |
| JP | 2011-114286 A | 6/2011 |
| JP | 2012-049443 A | 3/2012 |

* cited by examiner

METHOD AND DEVICE FOR PEELING OFF SILICON WAFERS

BACKGROUND OF THE INVENTION

1. Field of the Invention

The present invention relates to a method and a device for peeling off silicon wafers for semiconductors from a beam to which the silicon wafers after slice processing are bonded via an adhesive, for example.

2. Related art of the Invention

In recent years, as alternative energy to oil, solar photovoltaic generation has been noticed.

In the solar photovoltaic generation, reduction in costs of silicon wafers that are used in bulk is required, so efficient manufacturing of silicon wafers from silicon ingots is now required.

The method for manufacturing silicon wafers comprises, roughly speaking, a bonding step, a slicing step, a rough-washing and peeling-off step, a wafer-separating step, a washing step, and an inspecting step.

Accordingly, referring to FIG. 4, descriptions are given more specifically regarding a conventional method for manufacturing silicon wafers.

Here, FIG. 4 is a schematic front view (the XZ plan view) of a conventional structure body, in which the silicon ingot 1, the beam 2, and the base plate 10 are bonded.

The silicon ingot 1 is monocrystalline or polycrystalline silicon, which is shaped like a round column or a square column. The beam 2 is, in this conventional method for manufacturing silicon wafers, a glass plate that is a protector for preventing fracture of the processing end part of the silicon ingot 1. The base plate 10 is a jig for installation to a device called a wire saw for manufacturing the thin silicon wafers 1a from the silicon ingot 1 by slice processing. The adhesive 8 is, in this conventional method for manufacturing silicon wafers, a two-component liquid.

To begin with, in the bonding step, the adhesive 8 is applied to the silicon ingot 1 or the beam 2 to bond the silicon ingot 1 and the beam 2 and, besides, the adhesive 8 is applied to the beam 2 or the base plate 10 to bond the beam 2 and the base plate 10.

Next, in the slicing step, the slice processing is performed with the wire saw with respect to the silicon ingot 1 that has been bonded to the beam 2 and the base plate 10. The silicon ingot 1 that has become one thousand and several hundred sheets of the silicon wafers 1a by the slice processing is bonded to the beam 2 via the adhesive 8. Usually, the slice processing is performed so that the gaps between the adjacent silicon wafers 1a reach from the side of the silicon ingot 1 to a part of the adhesive 8 and the beam 2 on the side of the silicon ingot 1.

Next, in the rough-washing and peeling-off step, the silicon wafers 1a that are bonded to the beam 2 are washed, and the one thousand and several hundred sheets of the silicon wafers 1a are peeled off from the beam 2 en bloc using hot water of 50° C. for allowing the adhesive 8 to thermally soften, or an agent such as lactic acid and the like as a washing agent.

Next, in the wafer-separating step, the silicon wafers 1a overlapping each other, which have been peeled off from the beam 2 en bloc, are separated one by one so that the silicon wafers 1a are placed apart from each other.

Next, in the washing step, the silicon wafers 1a that have been separated are washed.

And, in the inspecting step, the silicon wafers 1a that have been washed are inspected.

By the way, in the aforesaid rough-washing and peeling-off step, the one thousand and several hundred sheets of the silicon wafers 1a are peeled off from the beam 2 en bloc as mentioned above.

Because of this, there often arises a state where a silicon wafer 1a that has been peeled off overlaps onto another silicon wafer 1a that has been peeled off, or silicon wafers 1a that have been peeled off fall toward each other.

And, there is a case where the silicon wafer 1a in a state like this cracks, or an edge part of the silicon wafer 1a chips.

Further, since work is necessary such that the silicon wafers 1a, which have been unevenly accumulated in the rough-washing and peeling-off step, are uniformly accumulated by hand to be allowed to move for the next wafer-separating step, or are repacked in a rack for the wafer-separating step, it is feared that efficiency of manufacturing decreases.

Accordingly, a method for peeling off silicon wafers is known such that the silicon wafers 1a are peeled off from the beam 2 one by one while the adhesive 8 is heated by spraying a hot wind in the air from the −Y side, that is, the surface side of the silicon wafer 1a on the outermost side that is to be peeled off (see, for example, Japanese Utility Model Registration Publication No. 3149712).

Further, in the aforementioned method for peeling off silicon wafers, the rough-washing is not performed, and the hot wind is sprayed in a state where the powdery silicon sludge that arises during the slice processing and the processing liquid are mixed together and are choking the gaps between the adjacent silicon wafers 1a.

SUMMARY OF THE INVENTION

However, even by a conventional method like this for peeling off silicon wafers, it is still not easy to efficiently peel off the silicon wafers 1a from the beam 2 one by one.

And, in the aforementioned conventional method for peeling off silicon wafers, since the silicon ingot 1 after the slice processing is heated by the sprayed hot wind, it is feared that the surface of the silicon wafer 1a oxidizes through a reaction with oxygen in the air and the quality of the silicon wafer 1a deteriorates.

The present invention, in view of the conventional problems that has been mentioned above, furnishes a method and a device for peeling off silicon wafers such that it is possible to more efficiently peel off silicon wafers from a beam one by one while suppressing deterioration in the quality of the silicon wafers, for example.

The $1^{st}$ aspect of the present invention is a method for peeling off silicon wafers, wherein plural silicon wafers, which are bonded to a board-shaped member via an adhesive, are peeled off from the board-shaped member in a liquid by heating of the board-shaped member.

The $2^{nd}$ aspect of the present invention is a method for peeling off silicon wafers according to the $1^{st}$ aspect of the present invention, wherein a part of an outer periphery part of the silicon wafers is a plane, and the plane of the part of the outer periphery part, and a surface of the board-shaped member are bonded via the adhesive.

The $3^{rd}$ aspect of the present invention is a method for peeling off silicon wafers according to the $2^{nd}$ aspect of the present invention, wherein the peeling off of the silicon wafers is performed in a state where the silicon wafers are arranged on an upper side of the board-shaped member with respect to a vertical direction.

The 4$^{th}$ aspect of the present invention is a method for peeling off silicon wafers according to the 3$^{rd}$ aspect of the present invention, wherein the peeling off of the silicon wafers is repeatedly performed while the board-shaped member is allowed to move relatively with respect to a heating unit for performing the heating.

The 5$^{th}$ aspect of the present invention is a method for peeling off silicon wafers according to any of the 1$^{st}$ to 4$^{th}$ aspects of the present invention, wherein the board-shaped member is electrically conductive, and
the heating of the board-shaped member in the liquid is performed by an induction heating method.

The 6$^{th}$ aspect of the present invention is a method for peeling off silicon wafers according to the 5$^{th}$ aspect of the present invention, wherein when the peeling off of the silicon wafers is performed, a temperature of an outer, periphery part of the board-shaped member is higher than a temperature of a central part of the board-shaped member.

The 7$^{th}$ aspect of the present invention is a device for peeling off silicon wafers, comprising:

a supporting member that is configured to support a board-shaped member to which plural silicon wafers are bonded via an adhesive;

a heating unit for heating the board-shaped member;

a shifting mechanism that is configured to shift, in a horizontal direction, the supporting member relatively with respect to the heating unit;

a peeling-off mechanism that is configured to peel off the silicon wafers one by one; and a container for allowing the silicon wafers, the board-shaped member and the supporting member to soak in a liquid.

The 8$^{th}$ aspect of the present invention is a device for peeling off silicon wafers according to the 7$^{th}$ aspect of the present invention, wherein the board-shaped member is electrically conductive, and
the heating unit is an induction heating coil.

By the present invention, a method and a device for peeling off silicon wafers can be furnished such that it is possible to more efficiently peel off silicon wafers from a beam one by one while suppressing deterioration in the quality of the silicon wafers, for example.

Figure 1:
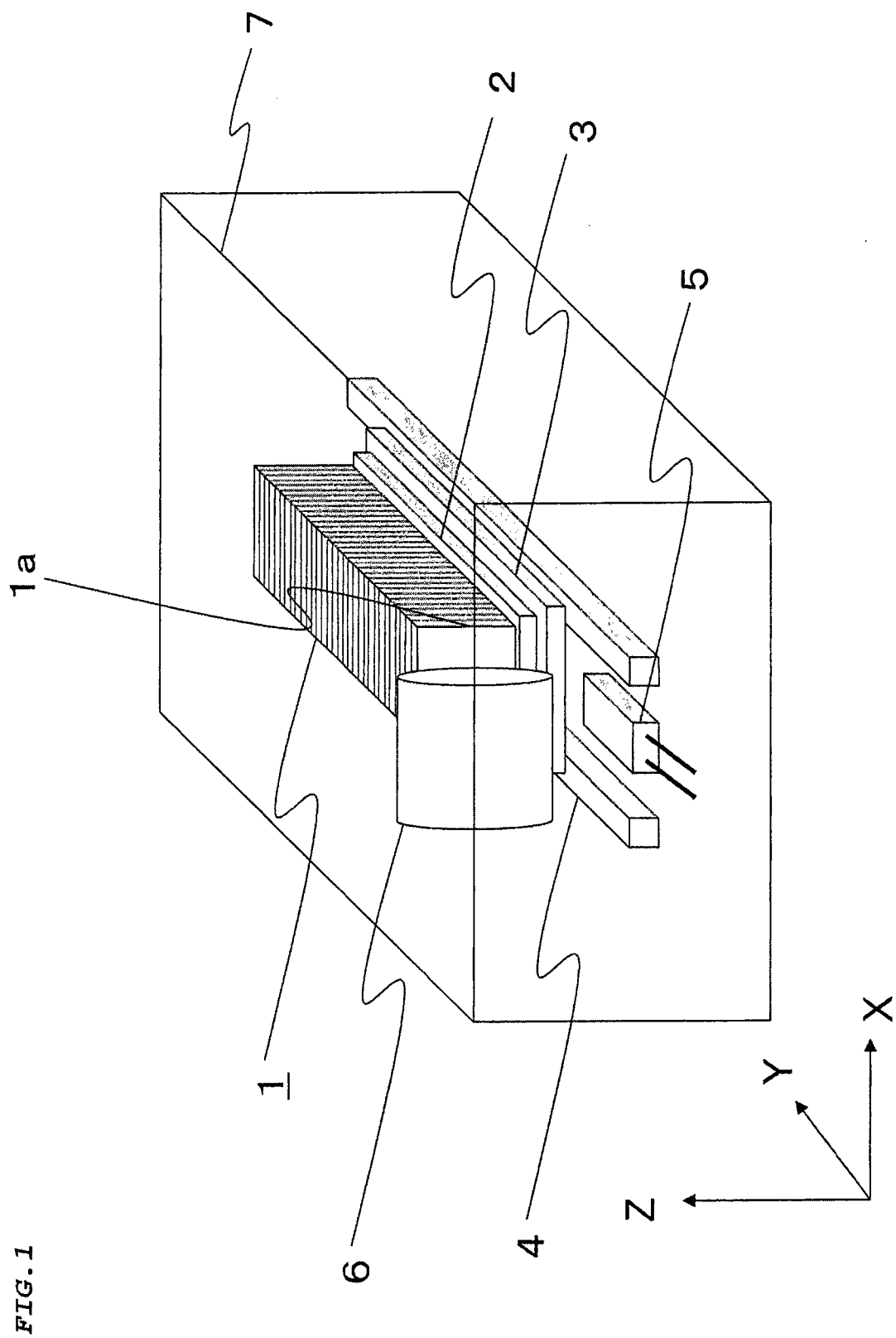
FIG. 1 is a schematic perspective view of a device for peeling off silicon wafers of an embodiment of the present invention.

DESCRIPTION OF SYMBOLS 1 silicon ingot
2 beam
3 heat insulator
4 shifting mechanism
5 induction heating coil
6 sucking pad
7 container

PREFERRED EMBODIMENTS OF THE INVENTION

In the following, referring to the drawings, descriptions are given in detail regarding embodiments in the present invention.

In the beginning, mainly referring to FIG. 1, descriptions are given regarding the constitution of a device for peeling off silicon wafers of the present embodiment.

Here, FIG. 1 is a schematic perspective view of a device for peeling off silicon wafers of an embodiment of the present invention.

The device for peeling off silicon wafers of the present embodiment comprises the heat insulator 3, the induction heating coil 5, the shifting mechanism 4, the sucking pad 6, and the container 7.

Figure 2:
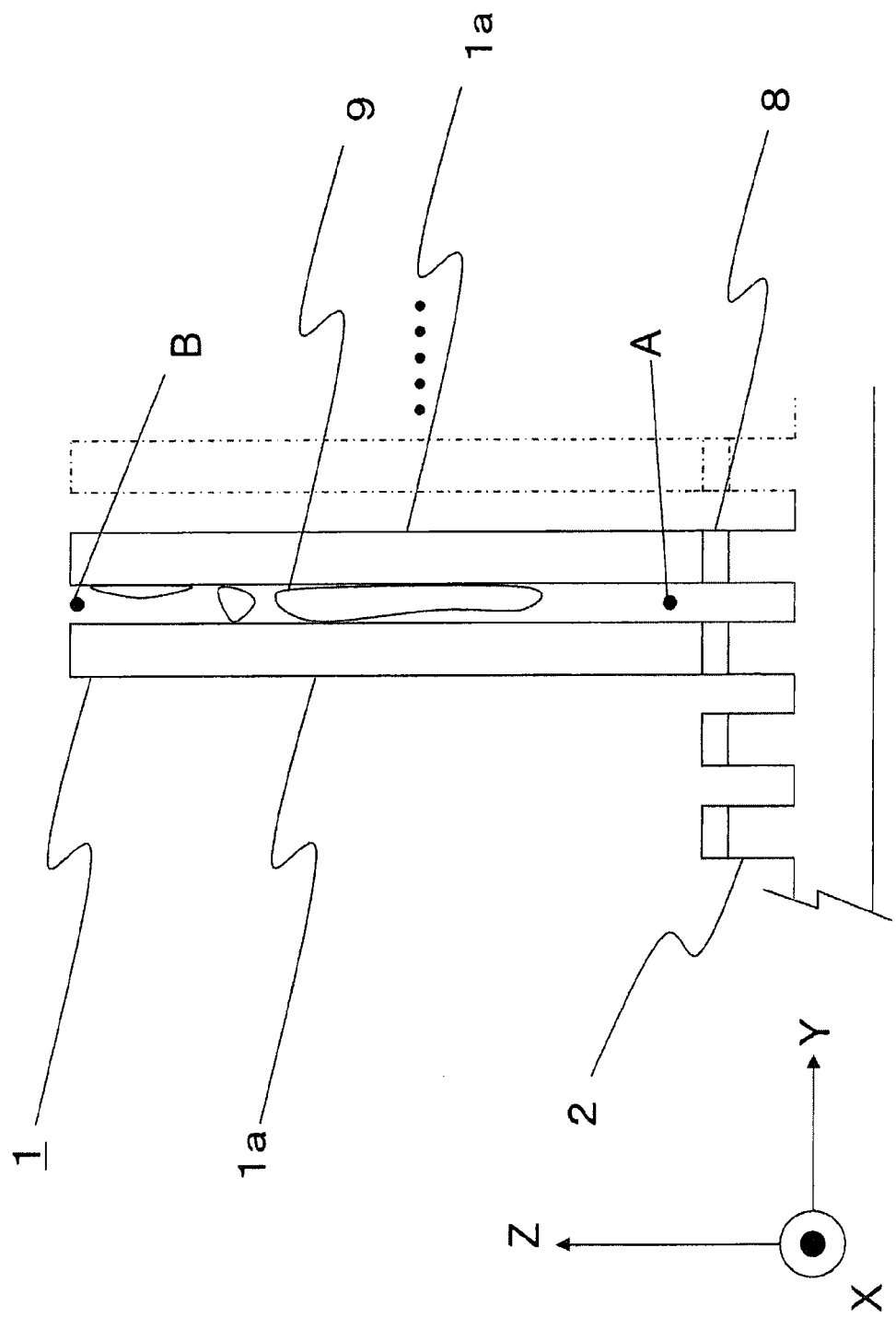
FIG. 2 is a schematic enlarged partial side view of a device for peeling off silicon wafers of an embodiment of the present invention.
Figure 3:
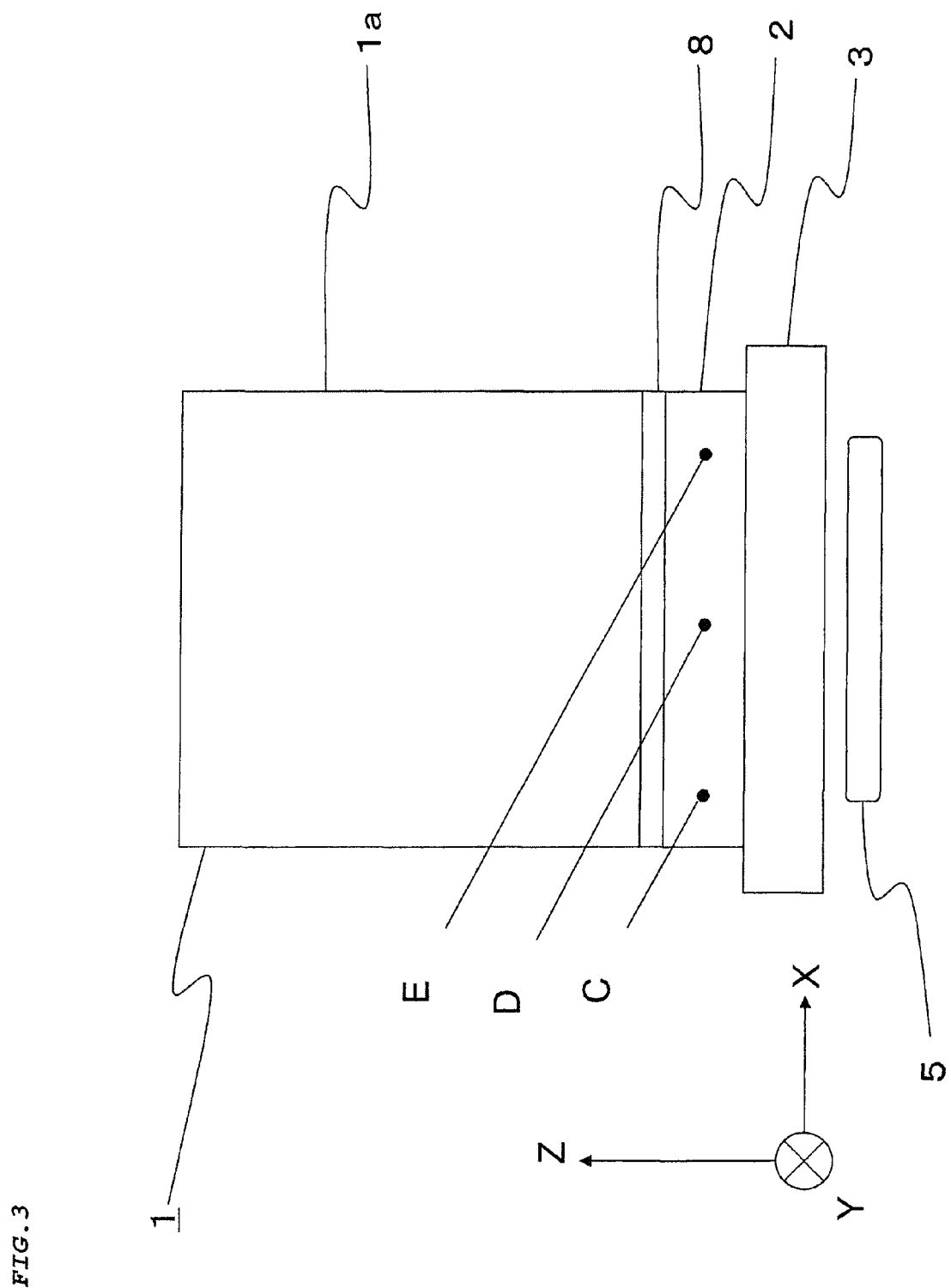
FIG. 3 is a schematic partial front view of a device for peeling off silicon wafers of an embodiment of the present invention.
Figure 4:
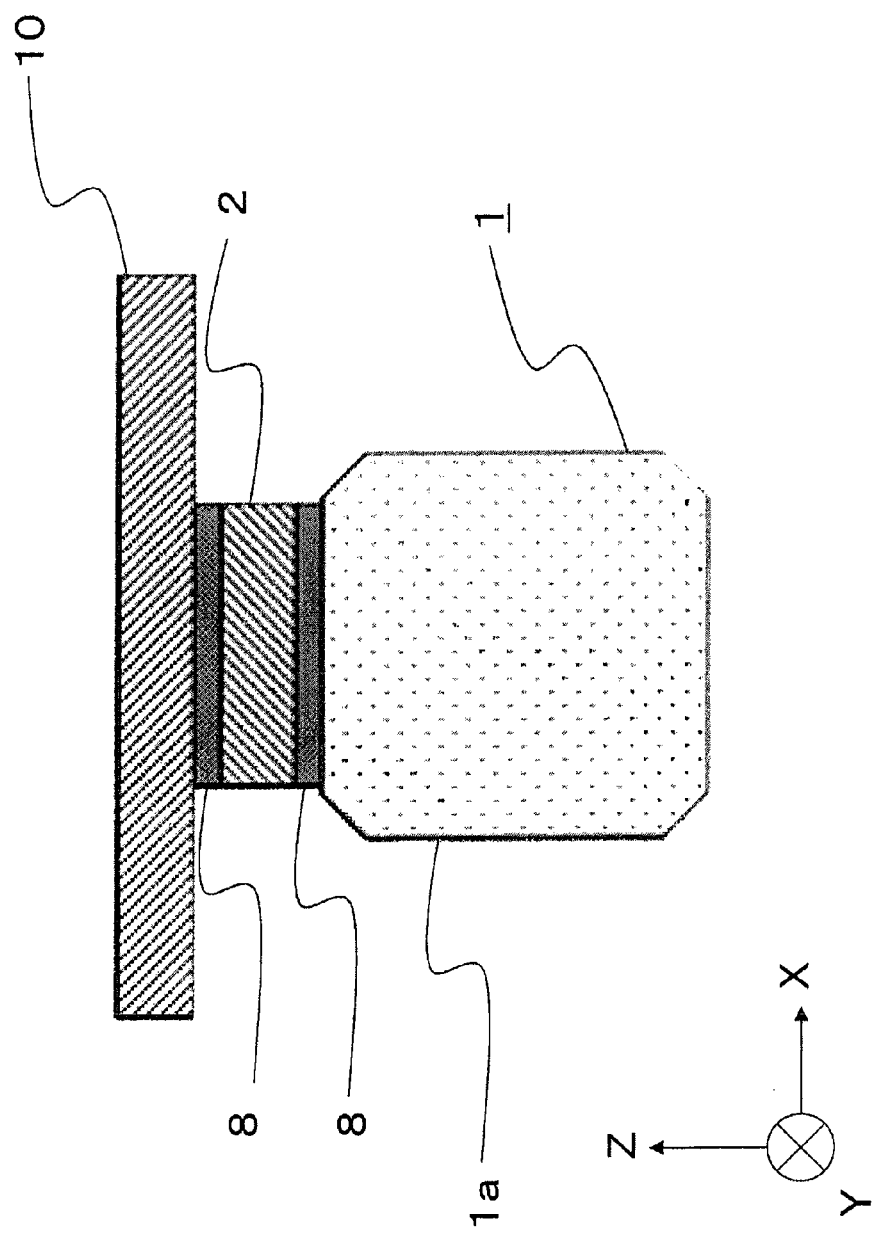
FIG. 4 is a schematic front view of a conventional structure body, in which a silicon ingot, a beam, and a base plate are bonded.

The heat insulator 3 is a unit for supporting the electrically conductive beam 2 to which the plural silicon wafers 1$a$ (see FIGS. 2 and 3) are bonded via the adhesive 8 (see FIGS. 2 and 3).

The induction heating coil 5 is a unit for heating the beam 2.

The shifting mechanism 4 is a unit for shifting, in a horizontal direction, the heat insulator 3 relatively with respect to the induction heating coil 5.

The sucking pad 6 is a unit for peeling off the silicon wafers 1$a$ one by one.

The container 7 is a unit for allowing the silicon wafers 1$a$, the beam 2 and the heat insulator 3 to soak in a liquid such as water.

In the present embodiment, the shifting mechanism 4 allows the heat insulator 3 to move without allowing the induction heating coil 5 to move, and the container 7 also allows the induction heating coil 5 to soak in the water.

However, another embodiment is of course considered such that, for example, the shifting mechanism 4 allows the induction heating coil 5 to move without allowing the heat insulator 3 to move, and the container 7 does not allow the induction heating coil 5 to soak in the water.

Further, the length of the container 7 in the Y direction has to be twice or more as large as the length of the heat insulator 3 in the Y direction, which is approximately equal to the length of the silicon ingot 1 in the Y direction, in the case where the shifting mechanism 4 allows the heat insulator 3 to move, but it is sufficient that the length of the container 7 in the Y direction is about the same as the length of the heat insulator 3 in the Y direction in the case where the shifting mechanism 4 allows the induction heating coil 5 to move.

Further, the heat insulator 3 is an example of the supporting member of the present invention, the induction heating coil 5 is an example of the heating unit of the present invention, the shifting mechanism 4 is an example of the shifting mechanism of the present invention, the sucking pad 6 is an example of the peeling-off mechanism of the present invention, and the container 7 is an example of the container of the present invention.

Moreover, the beam 2 is an example of the board-shaped member of the present invention.

Now, descriptions are given more specifically regarding the constitution of the device for peeling off silicon wafers of the present embodiment.

First, descriptions are given regarding the beam 2.

The material of the beam 2 is, for example, a material with glass, epoxy resin, acrylic resin, Bakelite (Registered Trademark), carbon, or the like being utilized, which is generally used as a material of a beam.

The material of the beam 2 is, since it is necessary to allow the beam 2 to generate heat by induction heating, necessarily an electrically conductive material and is, preferably, an electrically conductive material that includes magnetic bodies.

The material of the beam 2 is, more preferably, a material such that a fragile material such as a carbon and the like, or powdery magnetic bodies (Ni, Co, Fe, ferrite, and the like) are dispersed in a epoxy resin. In a case where the material of the beam 2 is a carbon, it is possible to lower the cost.

Further, in a case where the material of the beam 2 is a ductile material such as a metal and the like, it is feared that processability by a wire saw gets worse.

In the present embodiment, the size of the beam 2 is 110 mm (the X direction)×400 mm (the Y direction)×15 mm (the Z direction, that is, the thickness direction).

Next, descriptions are given regarding the adhesive 8.

The adhesive 8 may be a two-component liquid epoxy resin that is generally used often or, alternatively, may be a two-component liquid acrylic resin, or a thermohardening one-component liquid epoxy resin.

In a case where the adhesive 8 is a thermohardening one-component liquid epoxy resin and the induction heating coil 5 can heat the adhesive 8 at its hardening temperature, it is possible to raise productivity by using, without filling the container 7 with water, the device for peeling off silicon wafers of the present embodiment also as a device for hardening the adhesive 8.

Further, the hardening time is around 8 hours in a case where the adhesive 8 is a two-component liquid epoxy resin, but the hardening time is within 1 hour in a case where the adhesive 8 is a thermohardening one-component liquid epoxy resin and the device for peeling off silicon wafers of the present embodiment is used as a device for hardening the adhesive 8.

In the present embodiment, a mixture (XBM-3300, produced by Ajinomoto Co. Inc.) is used such that a poly-mer-captan microcapsule-type hardening agent is admixed with a mixture in the weight ratio of 1:1 of a bisphenol A type epoxy resin and a bisphenol F type epoxy resin as thermohardening one-component liquid epoxy resins, and the device for peeling off silicon wafers is used as a device for hardening the adhesive 8.

Next, descriptions are given regarding the heat insulator 3.

The material of the heat insulator 3 is an arbitrary material that does not block the magnetic flux, which arises when induction heating is performed utilizing the induction heating coil 5.

In the present embodiment, the material of the heat insulator 3 is FUSOSAMO (produced by FUSOKOGYO Co., Ltd.), and the size of the heat insulator 3 is 180 mm (the X direction)×500 mm (the Y direction)×20 mm (the Z direction, that is, the thickness direction).

Next, descriptions are given regarding the induction heating coil 5.

In the present embodiment, the material of the induction heating coil 5 is a copper tube structured such that cooling water flows through the hollow at its center, the copper tube is bent so as to be along the edges of the rectangle of 110 mm (the X direction)×400 mm (the Y direction), which gives the shape of the bottom face of the beam 2, and the size of the induction heating coil 5 is 110 mm (the X direction)×50 mm (the Y direction).

Since the induction heating coil 5 is used in the water with which the container 7 is filled, the outer periphery part of the induction heating coil 5 is coated with silicone rubber in order that oxidation accompanied with the induction heating is suppressed and, besides, an electric discharge inside the container 7 is avoided.

Further, the distance in the Z direction between the induction heating coil 5 and the beam 2 is 5 mm.

Moreover, the frequency used of the induction heating unit (EASYHEAT, produced by Ameritherm Inc.) is 150-400 Hz.

Next, descriptions are given regarding the container 7.

In the present embodiment, the container 7 is made of glass, and the size of the container 7 is 500 mm (the X direction)×1000 mm (the Y direction)×500 mm (the Z direction, that is, the depth direction).

Next, descriptions are given regarding the shifting mechanism 4.

The shifting mechanism 4 is a unit for repeatedly moving the beam 2, to which the silicon ingot 1 that has become one thousand and several hundred sheets of the silicon wafers 1a by slice processing is bonded, from the initial position, where the beam 2 has been first set to the heat insulator 3, to the position where the sucking pad 6 can suck the silicon wafer 1a on the −Y side, that is, on the outermost side.

Finally, descriptions are given regarding the sucking pad 6.

The sucking pad 6 is a unit for sucking the silicon wafers 1a utilizing the Bernoulli Chuck.

Further, the silicon wafers 1a, which have been sucked, are conveyed from underwater to the air and are settled in a rack for silicon wafer exclusive use through a conveyance belt, and the washing of the silicon wafers 1a is performed by the rack or one by one by single wafer processing.

Next, mainly referring to FIGS. 2 and 3, descriptions are given regarding the operation of the device for peeling off silicon wafers of the present embodiment.

Here, FIG. 2 is a schematic enlarged partial side view (the YZ plan view) of a device for peeling off silicon wafers of an embodiment of the present invention, and FIG. 3 is a schematic partial front view (the XZ plan view) of a device for peeling off silicon wafers of an embodiment of the present invention.

Further, while descriptions are given regarding the operation of the device for peeling off silicon wafers of the present embodiment, descriptions are also given regarding an embodiment of a method for peeling off silicon wafers.

Indeed, the principles of the peeling off in the present embodiment are as follows.

The beam 2, to which the silicon ingot 1 that has become one thousand and several hundred sheets of the silicon wafers 1a by slice processing is bonded via the adhesive 8, is set to the heat insulator 3 and is kept in the container 7 that is filled with water.

Hence, the surrounding of the silicon ingot 1 is filled with the water, and the silicon sludge 9 (see FIG. 2), which arose when the slice processing was performed, contains the water and is choking the gaps between the adjacent silicon wafers 1a.

When an alternating current is allowed to flow through the induction heating coil 5, a magnetic flux line the direction and intensity of which change arises in the surrounding of the induction heating coil 5, an eddy current flows through the beam 2 under the influence of this magnetic flux line, and the Joule heat arises.

When induction heating is started in this way, the beam 2 is heated to about 80° C., and the adhesive 8 is also heated efficiently to about 80° C. by heat conduction from the beam 2 it is in contact with.

Then, since the adhesive strength of the adhesive 8 decreases without delay, the silicon wafers 1a become able to be peeled off from the beam 2 with ease by an application of physical stress.

And, since the silicon ingot 1 is indirectly heated slightly by heat conduction from the beam 2 via the adhesive 8, the surface of the silicon wafer 1a hardly oxidizes through a reaction with oxygen, and it is almost never feared that the quality of the silicon wafer 1a deteriorates.

Now, more specific descriptions regarding the principles of the peeling off are given as follows.

Namely, the heat that has arisen in the beam 2 is conducted to the water in the surrounding, and the temperature of the water in the neighborhood of the point A (see FIG. 2) that is near to the beam 2 begins to rise.

Since the temperature of the water in the neighborhood of the point A becomes higher than the temperature of the water in the neighborhood of the point B (see FIG. 2) that is on the upper side with regard to the +Z direction, that is, the vertically upward direction, the specific gravity of the water in the neighborhood of the point A becomes smaller than the specific gravity of the water in the neighborhood of the point B, and the water in the neighborhood of the point A moves towards the +Z direction.

Then, a water current in the +Z direction arises, which is from the point A towards the point B, involving the silicon sludge 9 that is choking the gaps between the adjacent silicon wafers 1a.

Most of the silicon sludge 9, since the size of each piece of the silicon sludge 9 is not so large, does not stick to the silicon wafers 1a and is involved in the aforesaid water current to move toward the +Z direction, some passes the neighborhood of the point B to go outside, and some accumulates in the neighborhood of the point B.

Further, the silicon sludge 9 that has accumulated in the neighborhood of the point B contributes toward broadening the magnitude of the gaps between the adjacent silicon wafers 1a in the Y direction to get the stress arising that promotes the peeling off of the silicon wafers 1a.

In this manner, since an adjacent silicon wafer 1a does not exist on the outer side, the silicon wafer 1a on the −Y side, that is, on the outermost side naturally falls toward the sucking pad 6 to be sucked by the sucking pad 6, and is conveyed outside the container 7.

Of course, while the beam 2 is allowed to move relatively with respect to the induction heating coil 5, the peeling off of the silicon wafers 1a is repeatedly performed.

Since most of the silicon sludge 9 is released from the silicon wafer 1a and disperses into the water at the point of time when the silicon wafer 1a is conveyed outside the container 7, it is possible to reduce attachment of the silicon sludge 9 to the silicon wafer 1a that has been peeled off.

And, it is preferable that, when the peeling off of the silicon wafers 1a is performed, the temperature of the outer periphery part of the beam 2 is higher than the temperature of the central part of the beam 2.

With the above-mentioned shape of the induction heating coil 5, since the temperature of the water in the neighborhood of the points C and E (see FIG. 3) of the outer periphery part of the beam 2 that is near to the induction heating coil 5 becomes higher than the temperature of the water in the neighborhood of the point D (see FIG. 3) of the central part of the beam 2 that is far from the induction heating coil 5, the adhesive strength of the adhesive 8 in the neighborhood of the points C and E easily decreases compared with the adhesive strength of the adhesive 8 in the neighborhood of the point D.

Hence, it is possible to peel off the silicon wafers 1a from the beam 2 with ease, while reducing attachment of the adhesive 8 to the silicon wafers 1a that have been peeled off.

Besides, it is preferable that the peeling off of the silicon wafers 1a is performed in a state where the silicon wafers 1a are arranged on the upper side of the beam 2 with respect to the vertical direction. In a case where the silicon wafers 1a are arranged on the upper side of the beam 2 with respect to the vertical direction, it is possible to allow the silicon sludge 9 to move utilizing the aforesaid water current.

Further, in a case where the silicon wafers 1a are arranged on the lower side of the beam 2 with respect to the vertical direction, it is feared that (1) since the load of the silicon wafer 1a acts upon the adhesive 8 in the −Z direction, that is, the vertically downward direction, the silicon wafer 1a unexpectedly falls down from the beam 2, or (2) the sucking pad 6 can not suck only the silicon wafer 1a on the outermost side, because the force that acts upon the adhesive 8 varies depending on the quantity of the silicon sludge 9 that is choking the gaps between the adjacent silicon wafers 1a, and/or the way how the adjacent silicon wafers 1a are in close contact with each other.

The water is an example of the liquid of the present invention in which the silicon wafers 1a are peeled off from the beam 2, and exemplified as other specific examples of the liquid are alcohol, ether, a solution such that a washing agent such as lactic acid or the like is mixed into one of these, and the like, so a liquid is selectable according to the situation.

And, as has been mentioned above, the induction heating coil 5 is an example of the heating unit of the present invention, and exemplified as other specific examples of the heating unit are an ultrasonic-wave heating unit, a laser heating unit, a contact-current-supplying heating unit that allows electrodes to be in contact with the beam 2 and directly supplies a current to carry out heating, and the like, so a heating unit is selectable according to the situation.

In this way, with the present embodiment, since the peeling off of the silicon wafers can be performed with no manual operations without allowing the quality of the silicon wafers to deteriorate, productivity of silicon wafers for semiconductors is raised.

A method and a device for peeling off silicon wafers in the present invention, with which it is possible to more efficiently peel off silicon wafers from a beam one by one while suppressing deterioration in the quality of the silicon wafers, for example, are useful for a method and a device for peeling off silicon wafers for semiconductors from a beam to which the silicon wafers after slice processing are bonded via an adhesive.

What is claimed is:

1. A method for peeling off silicon wafers, wherein plural silicon wafers, which are bonded to a beam via an adhesive, are peeled off from the beam in a liquid by heating of the beam, the beam includes a plane, each of the plural silicon wafers includes a plane, in a state where each of the planes of the plural silicon wafers is substantially perpendicular to the plane of the beam, the plural silicon wafers are arranged, with gaps between the adjacent silicon wafers, on an upper side of the plane of the beam with respect to a vertical direction, and in a state where edges of the plural silicon wafers are bonded to the plane of the beam via the adhesive, the peeling off of the silicon wafers is repeatedly performed one by one from an outermost side of the plural silicon wafers arranged.

2. A method for peeling off silicon wafers according to claim 1, wherein
the peeling off of the silicon wafers is repeatedly performed while the beam is allowed to move relatively with respect to a heating unit for performing the heating.

3. A method for peeling off silicon wafers according to claim 1, wherein
the beam is electrically conductive, and
the heating of the beam in the liquid is performed by an induction heating method.

4. A method for peeling off silicon wafers according to claim 3, wherein
when the peeling off of the silicon wafers is performed, a temperature of an outer periphery part of the beam is higher than a temperature of a central part of the beam.

* * * * *